United States Patent [19]

Morgan et al.

[11] Patent Number: 4,626,587

[45] Date of Patent: Dec. 2, 1986

[54] EXTRUSION FINISHING OF PERFLUORINATED COPOLYMERS

[75] Inventors: Richard A. Morgan; William H. Sloan, both of Vienna, W. Va.

[73] Assignee: E. I. Du Pont de Nemours and Company, Wilmington, Del.

[21] Appl. No.: 752,174

[22] Filed: Jun. 28, 1985

Related U.S. Application Data

[63] Continuation-in-part of Ser. No. 571,198, Jan. 16, 1984, abandoned.

[51] Int. Cl.$^4$ ................................................ C08F 6/00
[52] U.S. Cl. .................................................... 528/481
[58] Field of Search ....................................... 528/481

[56] References Cited

FOREIGN PATENT DOCUMENTS 829600  3/1960  United Kingdom .

OTHER PUBLICATIONS

Gras, Plastics Design & Processing, Aug. 1972, pp. 24-29.

*Primary Examiner*—Paul R. Michl

[57] ABSTRACT

Unstable backbone links in melt-processible tetrafluoroethylene copolymers can be reduced by subjecting the copolymer to high shear in a twin-screw extruder.

5 Claims, No Drawings

EXTRUSION FINISHING OF PERFLUORINATED COPOLYMERS

CROSS-REFERENCE TO RELATED APPLICATIONS

This application is a continuation-in-part of application Ser. No. 571,198, filed Jan. 16, 1984, now abandoned.

FIELD OF THE INVENTION

This invention relates to treatment of raw perfluorinated copolymers to improve their thermal stability.

BACKGROUND

The aqueous dispersion copolymerization of tetrafluoroethylene (TFE) with perfluorinated alpha olefins such as hexafluoropropene (HFP) produces a raw product which must be further treated or "finished" before being melt fabricated into a useful final product. A major purpose of the "finishing" is to remove all sources of volatiles which could cause bubbles or voids in the final product.

Several sources of volatiles can exist in the unfinished or raw polymers including unstable endgroups and unstable backbone linkages. Various types of endgroups are possible but use of the common persulfate initiator leads to carboxylic acid endgroups. The degradation of these carboxylic acid ends can be a major source of volatiles at fabrication temperatures as was discussed in U.S. Pat. No. 3,085,083 (R. C. Schreyer). The polymer endgroups after extrusion may also be vinyl ($-CF=CF_2$), difluorohydride ($-CF_2H$), internal olefin [$-CF=CF(CF_2)CF_3,-(CF_2)_nCF_3$, or carboxylic acid fluoride ($-COF$). The relative amounts of these ends will be dependent on the extrusion conditions, the type of initiator, the presence of salts which can catalyze the decarboxylation, and moisture level.

The second source of volatiles is believed to be due to the presence in the polymer backbone of relatively unstable linkages which thermally degrade during fabrication. These links may be present even if the polymer has stable endgroups directly from polymerization. The elimination of most of these links is desirable to achieve a low volatiles level. The structure(s) of the unstable backbone linkages in perfluorocopolymers have not been identified but appear to be comonomer diads not involving TFE. Thus in TFE/HFP copolymers the unstable backbone linkage arises from two adjacent HFP units. The volatiles arising from initial thermal degradation of TFE/HFP copolymer flake (unfinished) are very rich in HFP monomer. The level of unstable backbone linkages in HFP/TFE copolymers appears to be an inverse function of molecular weight (and melt viscosity). This suggests that the HPF diad forms by combination as the termination mechanism in polymerization. Regardless of the structure of the polymer backbone instability, a concentration can exist which causes problems with bubble formation during melt fabrication.

SUMMARY OF THE INVENTION

It has been found that unstable backbone links may be removed under conditions of high shear such as in a twin screw extruder which is designed to achieve good mixing and high shear.

Specifically, the process of this invention is a process for preparing a thermally stable copolymer which comprises (a) subjecting a raw (i.e., as polymerized) melt-processible copolymer of 80–99% by weight units of tetrafluoroethylene and complementally 20–1% by weight units of at least one ethylenically unsaturated copolymerizable comonomer, which copolymer has a backbone volatiles index greater than 15 and a melt viscosity between $10^2$ and $10^6$ Pa.s, to an absolute pressure of less than $10^5$ Pa and at a temperature of between 220° C. and 450° C. while moving the copolymer through a twin screw extruder and subjecting the copolymer to a shear rate between 500 and 7000 reciprocal seconds for a time sufficient to result in the copolymer having a backbone volatiles index less than 10; and (b) removing the copolymer from the extruder.

Preferably, the twin screw contains kneading blocks.

Preferably, an absolute pressure of less than $10^4$ Pa will be employed.

Preferably, the copolymerizable comonomer will be hexafluoropropylene.

Preferably in step b), and particularly if subsequent finishing steps are to be carried out such as filtering or fluorinating, it is most convenient to remove the polymer from the extruder by attaching another extruder or another melt pumping device to the chamber and removing the copolymer simply by extruding it through this added extruder or pumping device, which may be a single screw extruder.

DESCRIPTION OF THE INVENTION

TFE copolymers are melt-processible fluorine-containing resins for instance, TFE/alpha olefins such as TFE-hexafluoropropylene copolymer. These melt-processable fluorine-containing resins are melt-flowable, that is, the melt viscosity of these resins is generally lower than $10^5$ poises at an optimum processing temperature and, therefore, they provide a film having less pinholes and voids as compared with polytetrafluoroethylene which has excellent chemical and corrosion resistance but has no melt-flowability or melt-processability since it has an extremely high melt viscosity of from $10^9$ to $10^{10}$ Pa.S even at a processing temperature of about 380° C.

The approximate shear rate can be calculated by the following formula:

$$\alpha = \pi \frac{DN}{h}$$

$\alpha$ = shear rate, $S^{-1}$
D = diameter of the screw (millimeters)
N = revolutions per second
h = the distance between the screw and the barrel wall (in millimeters)
$\pi$ = 3.1416

Shear rates will be highest at the screw tips and kneading block crests.

The temperature range employed is from 220 to 450° C. with the preferred range from 240° to 400° C.

The residence time employed is that needed to reduce the backbone volatiles index to the values recited above. Generally this will be between about 1 and 30 minutes.

If the polymer removed from the extruder contains unstable endgroups or if it has poor color, these problems can be eliminated by fluorination. The fluorination may be carried out with a variety of fluorine radical generating compounds under a variety of conditions as described in British Pat. No. 1210794. Preferably the polymer is contacted with a fluorine/inert gas mixture at an elevated temperature which is below the melting point of the polymer. If the fluorination is carried out in a partially filled (with polymer) container through which a fluorine/inert gas mixture is passed with agitation of the polymer to continually expose new surfaces, then the temperature may be 100° C.-250° C. with a preferred temperature of 130° C.-200° C. and the residence time may be 30 minutes to 12 hours, with a longer time being required with lower temperatures. A 25/75% mixture of fluorine/nitrogen is preferred as the fluorinating medium. The unstable ends are converted by the action of fluorine to perfluoromethyl ($-CF_3$) ends with the exception of carboxylic acid fluoride ends (which react very slowly with fluorine). Quantitative measurements of the endgroups may be made by infrared analysis as described in U.S. Pat. No. 3,085,083.

If the resin to be processed contains $-CF=CF_2$ end groups or end groups which are convertible to $-CF=CF_2$ end groups, then acid fluoride ($-COF$) ends may form by oxidation of the $-CF=CF_2$ groups Acid fluoride ends are resistant to stabilization techniques such as fluorination and thus should be minimized during the extrusion process. This may be done in two ways (1) The flake and the flake handling equipment may be sparged with nitrogen to remove atmospheric oxygen which might otherwise oxidize the vinyl end groups, (time of contact with nitrogen will be a time sufficient to essentially remove all absorbed and adsorbed oxygen), and (2) water may be injected into the extruder with the polymer so that any acid fluoride ends which are formed may be hydrolyzed to carboxylic acid ends. The required level of moisture addition depends on the level of acid fluoride ends which in turn depends on the type of end groups in the polymer feed and the severity of the extrusion conditions, but generally will be between 0.5-1.5% by weight based on copolymer.

The application of vacuum to the process functions to remove gases from resin degradation, excess water (if used), and low molecular weight fluoro-oligomers.

It should be apparent that techniques other than fluorination may also be utilized to eliminate unstable endgroups. One such method is humid heat treatment disclosed in U.S. Pat. No. 3,085,083.

Certain initiators such as the perfluoroacyl peroxides [F(CF$_2$)$_n$CO$_2$)$_2$O] give predominantly stable endgroups directly from polymerization and therefore do not require fluorination.

Test Procedures

Standard melt viscosities of the polymers were measured according to American Society for Testing and Materials test D-1238-52T, modified as follows: The cylinder, orifice and piston tip are made of a corrosion-resistant alloy, Haynes Stellite 19, made by Haynes Stellite Co. The 5.0 g sample is charged to the 9.53 mm (0.375 inch) inside diameter cylinder, which is maintained at 372° C.±1° C. Five minutes after the sample is charged to the cylinder, it is extruded through a 2.10 mm (0.0825 inch) diameter, 8.00 mm (0.315 inch) long square edge orifice under a load (piston plus weight) of 5000 grams. This corresponds to a shear stress of 44.8 kPa (6.5 pounds per square inch). The melt viscosity in Pa.s is calculated as 5317 divided by the observed extrusion rate in grams per minute.

The tendency of fluoropolymer to give bubbles during fabrication has been previously measured by a "volatiles index" test. This test measures the pressure built up by heating a polymer sample to 380° C. This pressure rise is the result of desorbed dissolved gases and polymer endgroup and backbone degradation. The primary purpose of the invention described herein is the removal of unstable backbone linkages. Thus all of the examples shown herein were treated with fluorine to remove unstable endgroups before analysis of volatiles content. A modification of the "volatiles index" test is employed to remove the contribution of dissolved gases, especially air, in the polymer to the observed pressure rise. In the procedure which was employed here, a 10.0 g (w) sample of the resin is placed in an aluminum foil thimble which is charged into a glass tube equipped on its top with a manometer. The tube is evacuated to 0.1-2 mm Hg (13.3-267 Pa) and then upon reaching equilibrium, is placed in a hot block maintained at 150° C. for three hours. The tube is reevacuated to remove the desorbed gases and then the tube is placed in a hot block maintained at 380° C. for at least 40 minutes. The pressure readings are recorded as a function of time. The backbone volatiles index is calculated by the following equation:

$$\text{Backbone } V.I. = \frac{(P_{40} - P_{10}) V}{10 w}$$

wherein $P_{10}$ and $P_{40}$ are the pressures of the sample in mm Hg after 10 and 40 minutes in the hot block, V is the volume of the tube in ml, and w the sample weight in grams. The volume of the apparatus was 110±10 ml.

When the analysis is performed as described above, a high "backbone volatiles index" indicates a relatively high level of polymer chain backbone unstable linkages which can potentially degrade and give volatiles and bubbles during melt fabrication of the resin such as into a molded article or as a coating onto wire. The "backbone volatiles index" should be less than 10, to avoid an amount of bubbles formed upon fabrication which is detrimental to the resin properties.

Color of the extruded or the extruded and fluorinated cubes was determined by projecting white light onto a sample, and passing the reflected light through filters and measuring it with a photocell. A high percent green (%G) reflectance indicates a high level of whiteness of the cubes. The colorimeter used in the examples was a "DuColor" colorimeter.

The color of the cubes as-extruded is dependent upon the severity of the extrusion conditions, the level and type of polymerization initiator residues present, and the level of contamination, if any. The color after subjecting to shear can be quite dark. Fluorination results in essentially white cubes as shown by the high %G values.

EXAMPLES

Reduction of Backbone Volatiles by Shear

Several tetrafluoroethylene/hexafluoropropylene copolymer (TFE/HFP copolymer) flake samples which had been polymerized with ammonium persulfate (APS) or mixed ammonium/potassium persulfate (APS/KPS) initiators and which had various melt viscosities as-polymerized, were finished as described below to give products having a reduced tendency to form bubbles upon melt-fabrication.

The experiments were carried out with a twin screw extruder, equipped with a vacuum port and vacuum system, which fed into a single screw extruder which was also equipped with a vacuum port and a screen pack and die. The twin screw extruder served as a resin melter and a reactor in which the desired backbone stabilization was conducted. The single screw extruder was used as a melt pump to generate the pressure necessary to move the resin through the screen pack and then the die. Vacuum was applied to remove volatiles from the molten resin.

The extrusion equipment described above is a "Kombiplast" extruder from the Werner and Pfleiderer Corporation. Corrosion-resistant materials were used for those parts which came into contact with the polymer melt. The twin-screw extruder had two corotating screws disposed side by side. The screw configurations were designed with an intermeshing profile and tight clearances, causing them to be self-wiping. The screw configurations included kneading blocks and conveying sections but the highest shear occurs in the kneading block sections. The screws contained three matched kneading block sections. In addition to the tight clearance in the kneading blocks, high screw speeds (up to 162 rpm) contributed to the high shear.

The twin screw extruder emptied into a single screw melt pump which was designed to generate pressure at low shear rates for filtration through the screenpack. The single screw extruder had a vacuum port at its rear where the melt arrived from the twin screw extruder. The screenpack contained several different screen sizes, the smallest being 200×600 mesh.

The die contained either 15 or 28 (larger number of die holes was used with higher viscosity resin) 2.5 mm diameter holes and the extruding melt was melt-cut into pellets which were cooled by a stream of water. The pellets were cylindrically shaped about 3.5 mm in diameter and 1.5–3.0 mm thick.

The details of the extrusion conditions are shown in Table I.

TABLE I

| EXTRUSION DATA - EXAMPLES 1, 2 AND 3 | | | |
|---|---|---|---|
| | Example | | |
| Parameter | 1 | 2 | 3 |
| Polymerization Initiator | APS/KPS | APS | APS/KPS |
| Feed MV (kPa.s) | 11.2 | 25.0 | 148. |
| Twin Screw Conditions | | | |
| Rate (g/s) | 17.7 | 17.3 | 13.2 |
| Shear Rate, s$^{-1}$ Channel | 63 | 83 | 46 |
| kneading Block Crest | 1380 | 1770 | 980 |
| Screw Speed (rpm) | 124 | 162 | 90 |
| Barrel Temp. °C. | 360 | 370 | 310 |
| Power (kW) | 3.3 | 8.5 | 6.0 |
| Hold Up Time, s | 576 | 324 | 792 |
| Vacuum Port Pressure (kPa) | 5.8 | 6.5 | 7.5 |
| Melt Temperature (exit), °C. | 316 | 352 | 323 |
| Single Screw Conditions | | | |
| Shear Rate, s$^{-1}$ Channel | 2.0 | 3.5 | 9.2 |
| Clearance | 97 | 170 | 450 |
| Screw Speed (rpm) | 8 | 14 | 37 |
| Barrel Temp. °C. | 360 | 370 | 350 |
| Power (kW) | 2.0 | 3.8 | 9.4 |
| Hold Up Time, s | 300 | 300 | 402 |
| Vacuum Port Pressure (kPa) | 12.3 | 11.6 | 13.3 |
| Screen Pack Conditions | | | |
| Pressure (MPa) | 10.1 | 15.2 | 21.4 |
| Hold Up Time, s | 800 | 820 | 1075 |
| Die Conditions | | | |
| Number of Die Holes | 15 | 15 | 28 |

TABLE I-continued

| EXTRUSION DATA - EXAMPLES 1, 2 AND 3 | | | |
|---|---|---|---|
| | Example | | |
| Parameter | 1 | 2 | 3 |
| Pressure (MPa) | 6.7 | 8.3 | 9.3 |
| Melt Temperature (°C.) | 365 | 372 | 365 |
| Product Properties | | | |
| Melt Viscosity (kPa.s) | 9.5 | 22.5 | 68.3 |
| % G | 5 | 18 | 5 |

The extruded pellets had the melt viscosities shown in Table I. The pellets were gray-brown in color as indicated by the low % G values (also in Table I). End-group analyses indicated that the pellets still contained some unstable endgroups, especially the sample of Example 2. The pellets were then exposed to fluorine gas to improve the color and eliminate the remaining unstable endgroups.

Subsequent Fluorination

A fluorination reactor was used, which was a modified double cone blender equipped with gas inlet and vent connections and an electric heating mantle. The gas inlet dipped down into the tumbling particles and the vent pointed up into the vapor space and both were held stationary within the rotating blender. The polymer pellets were placed in the reactor which was then sealed and rotation was begun at 5 rpm. The polymer pellets were heated with the electric mantle on the reactor and also with hot filtered air. When the polymer reached the desired temperature, the air stream was cut off and a vacuum was applied to the reactor to remove all air. A mixture of fluorine/nitrogen (25/75 volume %) was fed through the reactor for the desired time period while maintaining the temperature with the electric mantle heater. The conditions of fluorination are summarized in Table II.

TABLE II

| Example Sample | Polymer Charge[1] | Fluorination Time | Fluorination Temperature | Fluorine Added gm/kg polymer |
|---|---|---|---|---|
| 1 | 44% | 5 hours | 190° C. | 2.49 |
| 2 | 60% | 4 hours | 190° C. | 1.65 |
| 3 | 58% | 4 hours | 190° C. | 0.82 |

[1]Volume % of fluorinator capacity.

At the end of the fluorination cycle, the fluorine and the electric mantle heats were turned off and the reactor was once again evacuated slowly. The residual fluorine was then purged from the reactor with nitrogen. The nitrogen purge was checked for fluorine with moist potassium iodide paper (paper will darken in presence of fluorine). When the fluorine was gone, the gas flow was switched to cold air for cooling. After the batch was cooled, it was dropped.

The endgroup analyses showed almost complete removal of all unstable end groups. (See Table III) Other analyses of the fluorinated pellets are shown in Table IV. The color of the pellets was clear white and this is indicated by the high % G values.

The "backbone volatiles index" (BVI) values of the extruded and fluorinated pellets shown in Table IV are all well below the maximum of 10 which is believed to be necessary to permit bubble-free fabrication. The "backbone volatiles index" of the flake (fluorinated to remove endgroups) from which the examples were extruded are also shown in Table IV and are all greater than 15. It is apparent that the shear generated during extrusion is necessary to achieve a low "backbone volatiles index."

TABLE III
ENDGROUP ANALYSES

| | | Endgroups per $10^6$ C Atoms | |
|---|---|---|---|
| Example Sample | Endgroup* | Before Fluorination | After Fluorination |
| 1 | —COF | 0 | 0 |
|   | —$CO_2H(m)$ | 2 | 5 |
|   | —CF=$CF_2$ | 51 | 16 |
|   | —$CO_2H(D)$ | 0 | 0 |
| 2 | —COF | 24 | 2 |
|   | —$CO_2H(m)$ | 51 | 7 |
|   | —CF=$CF_2$ | 226 | 12 |
|   | —$CO_2H(D)$ | 19 | 0 |
| 3 | —COF | 0 | 0 |
|   | —$CO_2H(m)$ | 0 | 2 |
|   | —CF=$CF_2$ | 21 | 4 |
|   | —$CO_2H(D)$ | 0 | 0 |

Note:
N.A. - not analyzed.
*Two types of —$CO_2H$ endgroups are seen by infrared, the monomeric —$CO_2H(m)$ ends and the dimeric or hydrogen bonded $CO_2H(D)$ ends.

TABLE IV

| Example Sample | Fluorinated Flake (Not subjected to shear) | | Extruded and Sheared Pellets (But not Fluorinated) | | | Extruded, Sheared and Fluorinated Pellets | | |
|---|---|---|---|---|---|---|---|---|
| | MV kPa·s | BVI | MV kPa·s | % G | | MV kPa·s | BVI | % G |
| 1 | 9.10 | 20 | 9.5 | 5 | | 8.67 | 7.6 | 51 |
| 2 | 13.7 | 17 | 22.5 | 18 | | 14.3 | 5.7 | 54 |
| 3 | 88 | 16 | 68.3 | 5 | | 45.0 | 3.4 | 49 |

Control of Acid Fluoride Endgroups

An experiment was carried out to show the effect of water addition to a twin screw extruder, similar to the one used in the first section of these Examples, on the level of acid fluoride endgroups in the extruded product. The feed was a HFP/TFE copolymer which had been polymerized with mixed APS/KPS initiator and had a melt viscosity of 37.3 kPa.s and an HFP content of 10.0 weight percent. The extrusion equipment was similar to that described above except on a smaller scale. A 28 mm twin-screw extruder fed the polymer into a 38 mm single screw extruder and then through a screen pack and die. The resin was extruded with and without water addition (1.0% directly to the twin screw feed throat) under otherwise identical conditions. The resin extruded without water addition contained 37 acid fluoride ends per $10^6$ carbon atoms whereas the resin extruded with water addition contained no detectable acid fluoride ends.

Another experiment was carried out to show the effect of nitrogen sparging on acid fluoride end group formation. The same polymer feed and the same equipment were used as was described above for the experiments with water addition. It was found that sparging of the flake in the extruder feed bin to remove essentially all absorbed and adsorbed oxygen was not effective in reducing acid fluoride ends. However, when the flake was sparged with nitrogen under reduced pressure overnight and then fed to the extruder through a nitrogen blanketed feed system, no acid fluoride end groups were found in the extruded product. Apparently, the fluoropolymer flake contained enough absorbed and adsorbed air (oxygen) that a prolonged sparging was required. A control (no nitrogen sparging or water addition) for this experiment contained 22 acid fluoride end groups per $10^6$ carbon atoms.

We claim:

1. A process for reducing the backbone instability in a raw melt-processible copolymer of 80–99% by weight units of tetrafluorethylene and complementally 20–1% by weight units of hexafluorpropylene which comprises:
    (a) subjecting said raw melt-processible copolymer, which copolymer has a backbone volatiles index greater than 15 and a melt viscosity between $10^2$ and $10^6$ Pa.s, to a vacuum of less than $10^5$ Pa and to a temperature of between 220° C. and 450° C. while moving the copolymer through a twin screw extruder having intermeshing corotating screws that are self-wiping and which have tight clearance, and subjecting the copolymer to a shear rate between 500 and 7000 reciprocal seconds for a time sufficient to result in the copolymer having a backbone voltailes index less than 10; and
    (b) removing the copolymer from the extruder.

2. The process of claim 1 wherein the twin screw extruder contains kneading blocks.

3. The process of claim 1 or 2 wherein after step (b), the copolymer is contacted with fluorine gas while agitating the copolymer.

4. The process of claim 1 or 2 wherein water is added to the extruder in an amount necessary to remove all acid fluoride end groups.

5. The process of claim 1 or 2 wherein, prior to step (a), the copolymer us contacted with nitrogen for a time sufficient to remove essentially all absorbed and adsorped oxygen from the copolymer immediately prior to carrying out step (a).

* * * * *